United States Patent [19]

Ino et al.

[11] Patent Number: 4,694,131
[45] Date of Patent: Sep. 15, 1987

[54] INDUCTION HEATING METHOD AND APPARATUS FOR RELIEVING RESIDUAL STRESS IN WELDED JOINT BETWEEN MAIN AND BRANCH PIPES

[75] Inventors: Toshio Ino; Tsukasa Maenosono; Kazuo Yoshida; Masanori Terasaki; Tetsusho Kuriwaki, all of Yokohama; Tadao Koga, Kisarazu; Miharu Hirado, Yokohama, all of Japan

[73] Assignees: Daiichi Koshuha Kogyo Kabushiki Kaisha; Ishikawajima-Harima Jukogyo Kabushiki Kaisha, both of Tokyo, Japan

[21] Appl. No.: 738,968

[22] Filed: May 29, 1985

[30] Foreign Application Priority Data

May 31, 1984 [JP] Japan .................. 59-109600

[51] Int. Cl.$^4$ ............................................. H05B 6/40
[52] U.S. Cl. .................. 219/10.41; 219/10.71; 219/10.79; 219/10.57; 148/127
[58] Field of Search ............ 219/10.41, 10.43, 8.5, 219/9.5, 10.49 R, 10.57, 10.71, 10.75, 10.79; 148/127, 150, 152, 154, 13; 266/129

[56] References Cited

U.S. PATENT DOCUMENTS

| | | | |
|---|---|---|---|
| 2,184,534 | 12/1939 | Smith et al. | 219/8.5 X |
| 2,620,433 | 12/1952 | Denneen et al. | 266/129 X |
| 3,359,398 | 12/1967 | Reinke et al. | 219/10.43 |
| 4,354,883 | 10/1982 | Terasaki | 148/154 X |
| 4,505,763 | 3/1985 | Sugihara et al. | 219/10.79 X |

FOREIGN PATENT DOCUMENTS 58-135593 8/1983 Japan.

*Primary Examiner*—Philip H. Leung

[57] ABSTRACT

A heating method and heating apparatus for uniformly or substantially uniformly heating a predetermined portion of main and branch pipes including a welded joint therebetween of a main-and-branch-pipe assembly, thereby relieving the residual stress in the welded joint between the main and branch pipes. The defects and problems encountered in the conventional residual-stress-relief treatment processes can be substantially overcome such as complication in winding fabrication at the branch pipe which results in bad control of temperature; a mock-up test being needed for fabrication of an inductor; and existence of a non-heated zone resulting in unbalance of the stresses so that the effects of the residual stress-relief treatment are reduced.

1 Claim, 6 Drawing Figures

INDUCTION HEATING METHOD AND APPARATUS FOR RELIEVING RESIDUAL STRESS IN WELDED JOINT BETWEEN MAIN AND BRANCH PIPES

BACKGROUND OF THE INVENTION

The present invention relates to a heating method and heating apparatus for carrying out a residual-stress-relief treatment by induction heating (Induction Heating Stress Improvement) of pipe line systems in industrial plants and especially of welded joints between main and branch pipes and portions adjacent to the welded joints in nuclear power plants under construction or in operation.

Recently, the residual-stress-relief treatment (Induction Heating Stress Improvement) has been widely carried out to eliminate tensile stresses remaining in the inner surfaces of pipes due to heating effects at welded joints in pipe line systems or to change such residual stress into compression stress in nuclear power plants under construction or in operation.

In the pipe line systems as described above, an extremely large heating energy is transferred to pipes when they are joined by welding so that residual stress grows. As a result, the pipe lines tend to be reduced in strength and to be highly corrosive. For instance, when the operation of a nuclear power plant is started without making any treatment of welded joints in a pipe line system (especially a pipe line system using Type 304 austenitic stainless steel), high-temperature and high-pressure liquid flows through the pipe line system. The liquid is highly corrosive and the repeated thermal stress is caused in the pipe line system. Therefore, the tensile stress or residual stress grown in the portion adjacent to the welded joint due to the welding synergetically effect with the above-described adverse environments so that the fatigue strength is decreased. Furthermore, it has been found that anticorrosive property is decreased by chrominum carbide precipitated in intergranular in material so that so called intergranular corrosion cracks result. Therefore the residual-stress-relief treatment is carried out in order to prevent such intergranular corrosion cracks.

The residual-stress-relief treatment is such that the tensile stress caused in the inner surface of the pipes adjacent to the welded joint is eliminated or changed into the compression stress. The treatment is carried out as follows: First the inner surface of the pipe is cooled by liquid while only a portion adjacent to the welded joint is locally heated by a suitable heating means from the exterior so that a suitable temperature difference for relieving the stress is produced between the outer and inner wall surface of the heated portion, whereby the thermal stress in excess of a yield point is caused in the heated portion. Thereafter, the heated portion is cooled to room temperature while the liquid flows through the pipe line system so that the temperature difference between the outer and inner wall surfaces is eliminated. When such residual-stress-relief treatment is carried out in a pipe line system in an actual plant, the following problems arise.

FIGS. 1, 2 and 3 show devices which are disclosed in the Japanese Pat. No. 1207318; Japanese laid open application No. 58-135593; and U.S. Pat. No. 4,505,763, respectively and which are to be effective in carrying out the residual-stress-relief treatment of the welded joint between a main pipe and a branch pipe which is inclined at a suitable angle, and the welded joint between a branch pipe and a pipe base (a pipe structure consists of main pipe and short-pipe-like branch seat which has a suitable diameter and a suitable wall thickness and is welded to the main pipe) or main pipe and branch coaming. (The term "welded joint" used in this specification includes welded joints of the types described above). However, any of these devices cannot attain satisfactory residual stress relief. First, the device A as shown in FIG. 1 is apparently very much complicated in winding fabrication. Moreover, at the welded joint which is the most important part, an electric current flow changes its direction from the circumferential direction of the main pipe to the circumferential direction of the branch pipe or vice versa so that the magnetic flux density distribution is not uniform. As a result, it is difficult to control the temperature so that it becomes difficult to obtain a uniform temperature distribution. Furthermore, the branch pipes which are subjected to the residual-stress-relief treatment are different in size and shape so that a full-size branch pipe mock-up must be prepared based upon the measured data and an inductor must be modified many times based upon the full-size branch pipe mock-up until a satfisfactory inductor is designed. That is, an inductor to be used is fabricated through the so-called mock-up tests. As a result, there arises the problem that much time and expense are needed to design and fabricate a satisfactory device A.

The device B as shown in FIG. 2 has the same problems as described above. That is, no uniform temperature distribution can be obtained. In addition, the winding arrangement at the welded joint $b_1$ is very much complicated. As a result, it is extremely difficult to reproduce the same device so that a uniform temperature distribution is difficult to attain.

In this device B, in order to improve temperature controllability, ferromagnetic members $b_4$ and $b_5$ are interposed between the pipes and the coil at the points $b_2$ and $b_3$ at which the direction of the electric current flow changes so that a uniform temperature distribution may be obtained. In order to design and construct the device B, the mock-up tests are needed as in the case of the device A described above with reference to FIG. 1, thereby determining the sizes and positions of the ferromagnetic members $b_4$ and $b_5$.

In the case of the device C as shown in FIG. 3, a conductor $C_1$ is cocentrically wound about a branch pipe to cover the same and then is so wound as to cover the main pipe. The device C is different from the devices A and B in this respect. The conductor $C_1$ is wound around the main pipe not so as to completely cover it so that a lower portion $C_2$ of the main pipe in opposite relationship to the branch pipe is not heated. As a result, the stress is not balanced and the stress in the welded joint change from compression stress into tensile stress so that the effects of the residual-stress-relief treatment are reduced.

In summary, the fact that the welded joint and a predetermined portion adjacent to the welded joint including a zone in which no residual stress is caused are not wholly heated, adversely affects the residual-stress-relief treatment. For instance, assume that a pipe base W as shown in FIG. 4(I) is wholly and uniformly heated by a coil K and that the inner surface of the main and branch pipes be cooled by a coolant. Then tensile stress opposite to the residual stress is caused in the outer surfaces of the main and branch pipes while the compression stress is caused in the inner surfaces of the main and branch pipes constituting the base W. Let r denote the radius to the center of the wall of the branch pipe; let $t_1$ denote the wall thickness of the branch pipe; let R denote the radius of the main pipe; and let the thickness $t_1/r < <1$. Next let us consider that the pipe base W can be separated into the branch pipe $W_1$ and the main pipe $W_2$ as shown in FIG. 4(II). To the ends $W_3$ and $W_4$, the moment Mo given below $$Mo = \frac{t^2 \cdot E \cdot \alpha \cdot \Delta T}{12(1 - v)}$$

where
  E: Young's modulus,
  α: coefficient of linear expansion,
  ΔT: temperature difference between the outer and inner surfaces, and
  v: Poisson ratio
equally acts in the directions indicated by the arrows. In practice, at the welded joint of the pipe base W, moment Mo is balanced so that the above-described stress is caused.

However, when a branch pipe is uniformly heated but a main pipe is partially heated, a bending moment acting on the branch pipe is different from that acting on the main pipe. As a result, the balance between the moment Mo is collapsed so that the welded joint on the side of the main pipe is attracted into the branch pipe and the tensile stress is caused in the inner surface of the welded joint. Thus the residual-stress-relief treatment is ineffective.

In view of the above, the present invention has for its object to provide a heating method and heating apparatus which can subtantially overcome the above and other problems encountered in the conventional residual-stress-relief process and in which temperature control as well as winding arrangement can be simplified and which can improve the effects of the residual-stress-relief treatment.

The above and other objects, effects, features and advantages of the present invention will become more apparent from the following description of a preferred embodiment thereof taken in conjunction with the accompanying drawings.

DETAILED DESCRIPTION OF THE PREFERRED EMBODIMENT

According to the present invention, briefly stated, not only a main pipe and a branch pipe but also the welded joint therebetween are wholly and uniformly or substantially uniformly heated so that the problems encountered in the conventional residual-stress-relief treatment process and apparatus are overcome.

Figure 1:
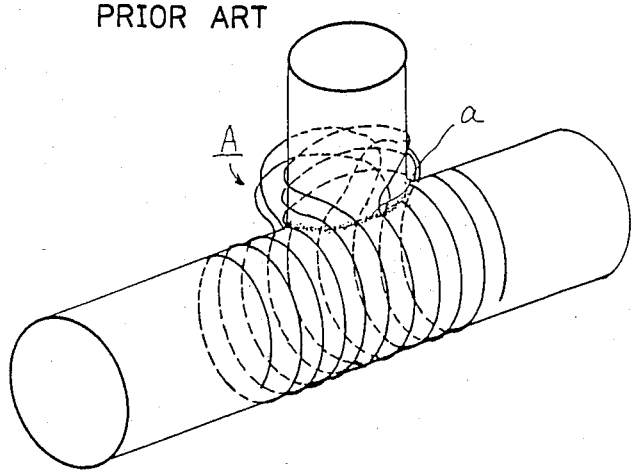
FIGS. 1, 2 and 3 are perspective views of conventional devices, respectively.
Figure 2:
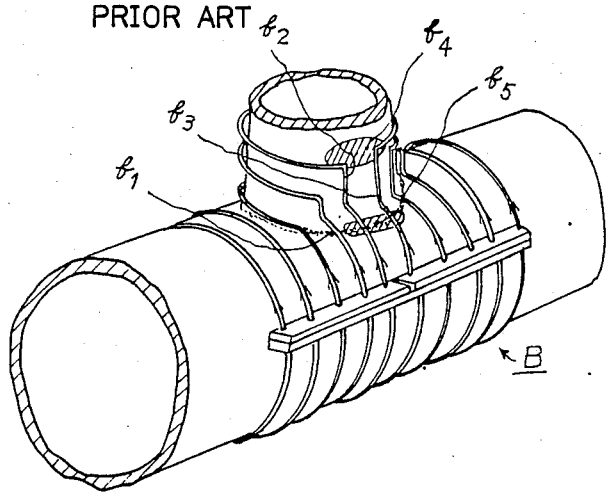
Figure 3:
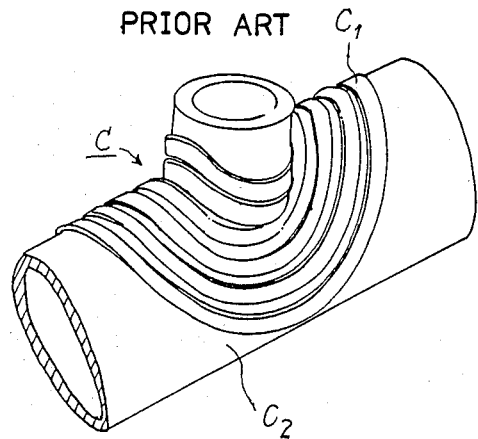
Figure 4I:
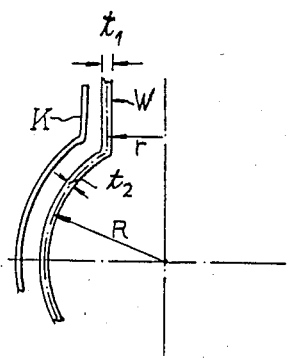
FIGS. 4(I) and 4(II) are views used to explain the underlying principle of the present invention.
Figure 4:
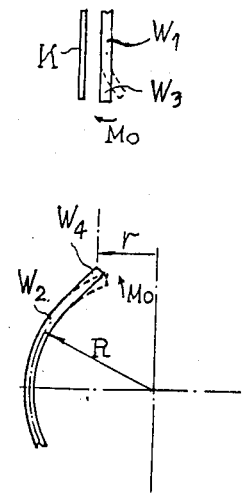
Figure 5:
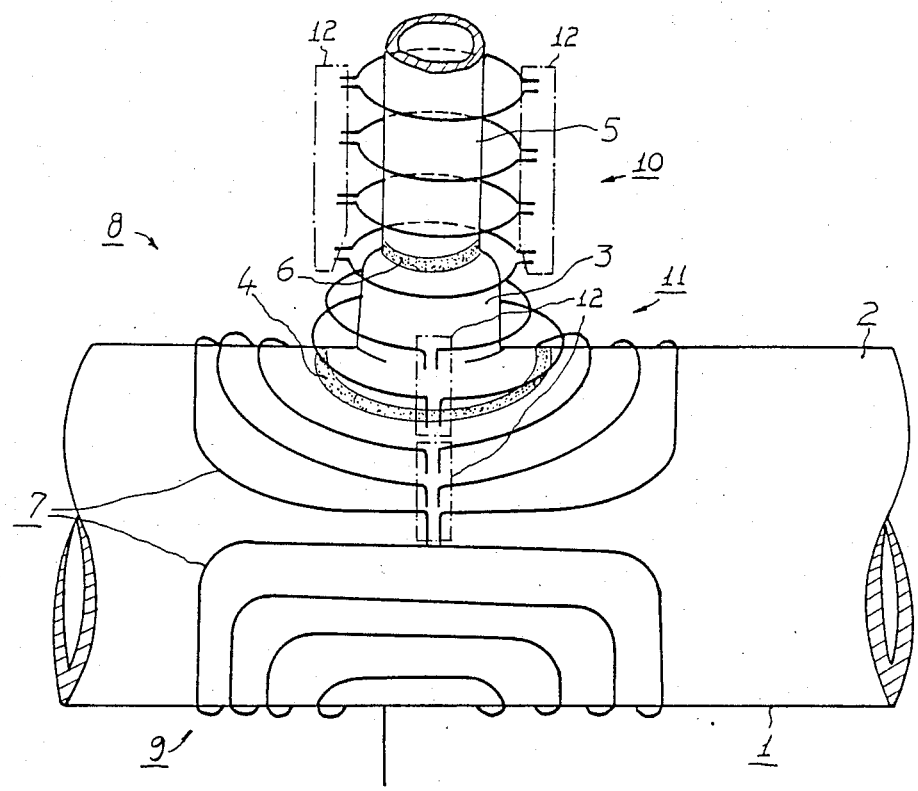
FIG. 5 is a side view of a preferred embodiment of the present invention.

Referring now to FIG. 5, a pipe with a branch pipe generally indicated by the reference numeral 1 comprises a main pipe 2, a pipe seat 3 welded to the main pipe 2 at 4, and a branch pipe 5 welded to the pipe seat 3 at 6. As described above, residual stress are caused in the welded joints 4 and 6.

In the present invention, a high-frequency induction heating coil 7 is used to carry out the residual-stress-relief treatment of the main-and-branch-pipe assembly 1. The coil 7 is so shaped that it surrounds the welded joints 4 and 6, a predetermined portion of the main pipe 2 adjacent to the welded joint 4 and a predetermined portion of the branch pipe 5 adjacent to the welded joint 6. In order that the coil 7 may be attached to the main-and-branch-pipe assembly 1 in a nuclear power plant under construction or in operation, the coil 7 is divided by a plane containing the axis of the main pipe 2 into an upper section 8 and a lower section 9 and the upper section 8 is further divided into a branch pipe section 10 and a main pipe section 11. Each of the branch pipe section 10 and the main pipe section 11 is further divided into two halves in the vertical direction. In order to obtain a uniform or substantially uniform magnetic flux density at zones surrounded by the induction heating coil 7 when the latter is energized, the coil sections are extended circumferentially over the pipe seat 3 and the branch pipe 5 and are extended cocentrically or helically of the branch pipe over the main pipe 2. Furthermore these induction heating coil sections are so disposed that the electric current flows in the same direction at all zones.

The induction heating coil 7, therefore, comprises a plurality of coil sections (not shown) divided in the manner described above. Each coil section has a shape adapted to mate with a portion which the coil heats, and is made of a pipe or the like having a high degree of electrical conductivity. In practice, coil sections adapted to mate with a main-and-branch-pipe assembly 1 which is subjected to the residual-stress-relief treatment are selected and mechanically and electrically interconnected with each other through connectors 12 such that the electric current flows through these coil sections in the same direction. Furthermore, if required, a coolant is forced to flow through the main and branch pipes 2 and 5. Moreover, the induction heating coil 7 may be reinforced with a suitable insulating material having a desired degree of strength.

The connectors 12 may be eliminated and the coil sections constituting the high-frequency induction heating coil 7 may be connected in series or in parallel as long as the electrical current flows through each coil section in the same direction. In other words, the electrical current flows in the same direction through the adjacent coil sections.

The high-frequency induction heating coil 7 assembled in the manner described above is attached to a main-and-branch-pipe assembly 1 to carry out the residual-stress-relief treatment.

First the coil sections 8, 9, 10 and 11 are disposed on the main-and-branch-pipe assembly 1 and electrically connected with each other through the connectors 12 in the manner described above, whereby the main-and-branch-pipe assembly 1 is surrounded by the high-frequency induction heating coil 7. If required, cooling water may be forced to flow through the induction heating coil 7. As described hereinafter, the coil 7 can establish a uniform magnetic flux density distribution over a predetermined portion including the welded joints 4 and 6 so that the predetermined portion can be uniformly heated into a desired temperature. As a result, the residual stress caused by welding can be improved.

According to the present invention, the high-frequency induction heating coil 7 is simple in construction, comprising a plurality of coil sections as described above so that fine temperature controls are possible for main-and-branch-pipe assemblies in various size and shape.

It is to be understood that the present invention is not limited to a main-and-branch-pipe assembly of the type in which a pipe base is welded to a main pipe and a branch pipe is welded to the pipe base and that the present invention may equally be applied to a main-and-branch-pipe assembly of the type in which a branch pipe is directly welded to a main pipe.

As described above, the present invention can provide a heating method and heating apparatus which are very effective in relieving residual stress in the welded joints of a main-and-branch-pipe assembly.

What is claimed is:

1. A heating method for relieving residual stress in a welded joint between main and branch pipes of the type in which a portion of said main and branch pipes including the welded joint between said main and branch pipes is surrounded with a high-frequency induction coil and said coil is energized to heat said portion, thereby relieving residual stress in said welded joint, which comprises the steps of dividing said high-frequency induction heating coil axially of said main pipe to form upper and lower coil sections and also axially of said branch pipe to form first and second sections, mounting each of said coil sections on a corresponding portion of said main and branch pipes to cover the entire circumferential surface area of both of said main and said branch pipes adjacent to said welded joint so as to mate with the whole circumferential surface area of said main and branch pipes to be heated including the welded joint therebetween and disposing all of said coil sections on said main and branch pipes so that electric current flowing through said coil sections will flow in the same direction through all of said coil sections, connecting said coil sections together and causing current to flow through all of said coil sections, and establishing a substantially uniform magnetic flux density distribution over said whole circumferential surface area of said main and branch pipes including the welded joint therebetween whereby said whole circumferential surface area of said main and branch pipes including said welded joint therebetween is substantially uniformly heated to a desired temperature.

* * * * *